(12) United States Patent
Jindal et al.

(10) Patent No.: US 11,886,809 B1
(45) Date of Patent: Jan. 30, 2024

(54) IDENTIFYING TEMPLATES BASED ON FONTS

(71) Applicant: Adobe Inc., San Jose, CA (US)

(72) Inventors: Nipun Jindal, Delhi (IN); Anand Khanna, San Jose, CA (US); Oliver Brdiczka, San Jose, CA (US)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 17/977,730

(22) Filed: Oct. 31, 2022

(51) Int. Cl.
| | | |
|---|---|---|
| *G06F 17/00* | (2019.01) | |
| *G06F 40/186* | (2020.01) | |
| *G06N 3/08* | (2023.01) | |
| *G06F 3/0484* | (2022.01) | |
| *G06F 40/109* | (2020.01) | |
| *G06F 40/30* | (2020.01) | |

(52) U.S. Cl.
CPC .......... *G06F 40/186* (2020.01); *G06F 3/0484* (2013.01); *G06F 40/109* (2020.01); *G06F 40/30* (2020.01); *G06N 3/08* (2013.01)

(58) Field of Classification Search
CPC .... G06F 40/186; G06F 3/0484; G06F 40/109; G06F 40/30; G06N 3/08
See application file for complete search history.

(56) References Cited

U.S. PATENT DOCUMENTS

| | | |
|---|---|---|
| 6,026,417 A | 2/2000 | Ross et al. |
| 9,449,080 B1 | 9/2016 | Zhang |
| 9,501,724 B1 | 11/2016 | Yang et al. |
| 9,836,765 B2 | 12/2017 | Hariri et al. |
| 10,402,064 B1 | 9/2019 | Al-Sallami et al. |
| 10,629,186 B1 | 4/2020 | Slifka |
| 11,829,710 B2 | 11/2023 | Brdiczka et al. |
| 2008/0250026 A1 | 10/2008 | Linden et al. |
| 2013/0103628 A1 | 4/2013 | Skelton et al. |
| 2013/0179252 A1 | 7/2013 | Dong et al. |
| 2016/0007065 A1 | 1/2016 | Peles et al. |
| 2016/0055132 A1* | 2/2016 | Garrison ............... G06F 16/958 706/12 |

(Continued)

OTHER PUBLICATIONS

Srivatsan, Nikita, et al. "A deep factorization of style and structure in fonts." arXiv preprint arXiv:1910.00748 (2019) (Year: 2019).*

(Continued)

*Primary Examiner* — Andrew T McIntosh
(74) *Attorney, Agent, or Firm* — FIG. 1 Patents

(57) ABSTRACT

In implementations of systems for identifying templates based on fonts, a computing device implements an identification system to receive input data describing a selection of a font included in a collection of fonts. The identification system generates an embedding that represents the font in a latent space using a machine learning model trained on training data to generate embeddings for digital templates in the latent space based on intent phrases associated with the digital templates and embeddings for fonts in the latent space based on intent phrases associated with the fonts. A digital template included in a collection of digital templates is identified based on the embedding that represents the font and an embedding that represents the digital template in the latent space. The identification system generates an indication of the digital template for display in a user interface.

20 Claims, 12 Drawing Sheets

(56) References Cited

U.S. PATENT DOCUMENTS

| | | |
|---|---|---|
| 2016/0349936 A1 | 12/2016 | Cho et al. |
| 2017/0061286 A1 | 3/2017 | Kumar et al. |
| 2017/0097743 A1 | 4/2017 | Hameed et al. |
| 2017/0344656 A1 | 11/2017 | Koren et al. |
| 2018/0121881 A1 | 5/2018 | Kumar et al. |
| 2019/0034976 A1 | 1/2019 | Hamedi et al. |
| 2019/0108203 A1* | 4/2019 | Wang .................... G06F 40/109 |
| 2019/0130231 A1* | 5/2019 | Liu ....................... G06N 3/045 |
| 2020/0143448 A1* | 5/2020 | Steck ................. G06Q 30/0643 |
| 2020/0153934 A1 | 5/2020 | Burbank et al. |
| 2020/0159995 A1 | 5/2020 | Mukherjee et al. |
| 2020/0394699 A1 | 12/2020 | Mueller |
| 2021/0044674 A1 | 2/2021 | Govan et al. |
| 2021/0103632 A1* | 4/2021 | Kadia ................. G06F 18/2431 |
| 2021/0103930 A1 | 4/2021 | Fu et al. |
| 2021/0109958 A1 | 4/2021 | Behtash et al. |
| 2021/0133249 A1 | 5/2021 | Parhi et al. |
| 2021/0200943 A1 | 7/2021 | Aviyam et al. |
| 2021/0224319 A1 | 7/2021 | Ingel et al. |
| 2021/0334666 A1* | 10/2021 | Lundin .................. G06N 3/088 |
| 2021/0342785 A1 | 11/2021 | Mann et al. |
| 2021/0406838 A1 | 12/2021 | Ramanath et al. |
| 2022/0124055 A1* | 4/2022 | Sharifi .................... H04L 51/02 |
| 2022/0139041 A1 | 5/2022 | Li et al. |
| 2022/0180650 A1* | 6/2022 | Tang .................... G06V 10/761 |
| 2022/0215606 A1 | 7/2022 | Radford et al. |
| 2022/0237935 A1* | 7/2022 | Liu ........................ G06T 11/203 |
| 2022/0351021 A1 | 11/2022 | Biswas et al. |
| 2022/0414320 A1 | 12/2022 | Dolan et al. |
| 2023/0114293 A1* | 4/2023 | Liu ........................ G06N 3/045 |
| | | 345/467 |
| 2023/0237251 A1 | 7/2023 | Brdiczka et al. |
| 2023/0315491 A1 | 10/2023 | Brdiczka et al. |

OTHER PUBLICATIONS

Campbell, Neill DF, and Jan Kautz. "Learning a manifold of fonts." ACM Transactions on Graphics (ToG) 33.4 (2014): 1-11 (Year: 2014).*

U.S. Appl. No. 17/583,818, "Non-Final Office Action", U.S. Appl. No. 17/583,818, dated Jan. 12, 2023, 18 pages.

Brdiczka, Oliver, et al., "U.S. Application as Filed", U.S. Appl. No. 17/583,818, filed Jan. 25, 2022, 56 pages.

Brdiczka, Oliver, et al., "U.S. Application as Filed", U.S. Appl. No. 17/657,477, filed Mar. 31, 2022, 73 pages.

Brdiczka, Oliver, et al., "US Application as Filed", U.S. Appl. No. 17/938,253, filed Oct. 5, 2022, 74 pages.

He, Xiangnan, et al., "Neural Collaborative Filtering", Cornell University arXiv, arXiv.org [retrieved Aug. 26, 2022]. Retrieved from the Internet <https://arxiv.org/pdf/1708.05031.pdf>., Aug. 26, 2017, 10 Pages.

Lin, Tsung-Yi, et al., "Focal Loss for Dense Object Detection", Cornell University arXiv, arXiv.org [retrieved Aug. 26, 2022]. Retrieved from the Internet <https://arxiv.org/pdf/1708.02002.pdf>., Oct. 2017, 10 pages.

U.S. Appl. No. 17/938,253, "Non-Final Office Action", U.S. Appl. No. 17/938,253, dated Apr. 25, 2023, 22 pages.

U.S. Appl. No. 17/583,818, "Corrected Notice of Allowability", U.S. Appl. No. 17/583,818, dated Aug. 24, 2023, 4 pages.

U.S. Appl. No. 17/583,818, "Notice of Allowance", U.S. Appl. No. 17/583,818, dated Jul. 17, 2023, 25 pages.

U.S. Appl. No. 17/938,253, "Final Office Action", U.S. Appl. No. 17/938,253, dated Aug. 22, 2023, 23 pages.

U.S. Appl. No. 17/657,477, "Non-Final Office Action", U.S. Appl. No. 17/657,477, dated Oct. 26, 2023, 62 pages.

* cited by examiner

IDENTIFYING TEMPLATES BASED ON FONTS

BACKGROUND

A digital template is typically created by a digital artist as including example content arranged in a visually pleasing layout or structure. The digital template is made available to users, for example, as part of a database of digital templates which is available via a network. A user identifies the digital template (e.g., by searching the database), and the user completes the digital template by replacing the example content with the user's content. For instance, the completed digital template includes the user's content arranged in the visually pleasing layout even though the user may not have been capable of creating the visually pleasing layout that was created by the digital artist.

SUMMARY

Techniques and systems for identifying templates based on fonts are described. In an example, a computing device implements an identification system to receive input data via a network describing a selection of a font included in a collection of fonts. For example, the collection of fonts includes thousands of different fonts. The identification system generates an embedding that represents the font in a latent space using a machine learning model trained on training data to generate embeddings for digital templates and fonts in the latent space. In some examples, the machine learning model is trained on the training data to generate embeddings for the digital templates in the latent space based on intent phrases associated with the digital templates and embeddings for the fonts in the latent space based on intent phrases associated with the fonts.

A digital template included in a collection of digital templates is identified based on the embedding that represents the font and an embedding that represents the digital template in the latent space. In one example, the collection of digital templates includes thousands of different digital templates. The identification system generates an indication of the digital template for display in a user interface.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures are indicative of one or more entities and thus reference is made interchangeably to single or plural forms of the entities in the discussion.

DETAILED DESCRIPTION

Overview

Figure 1:
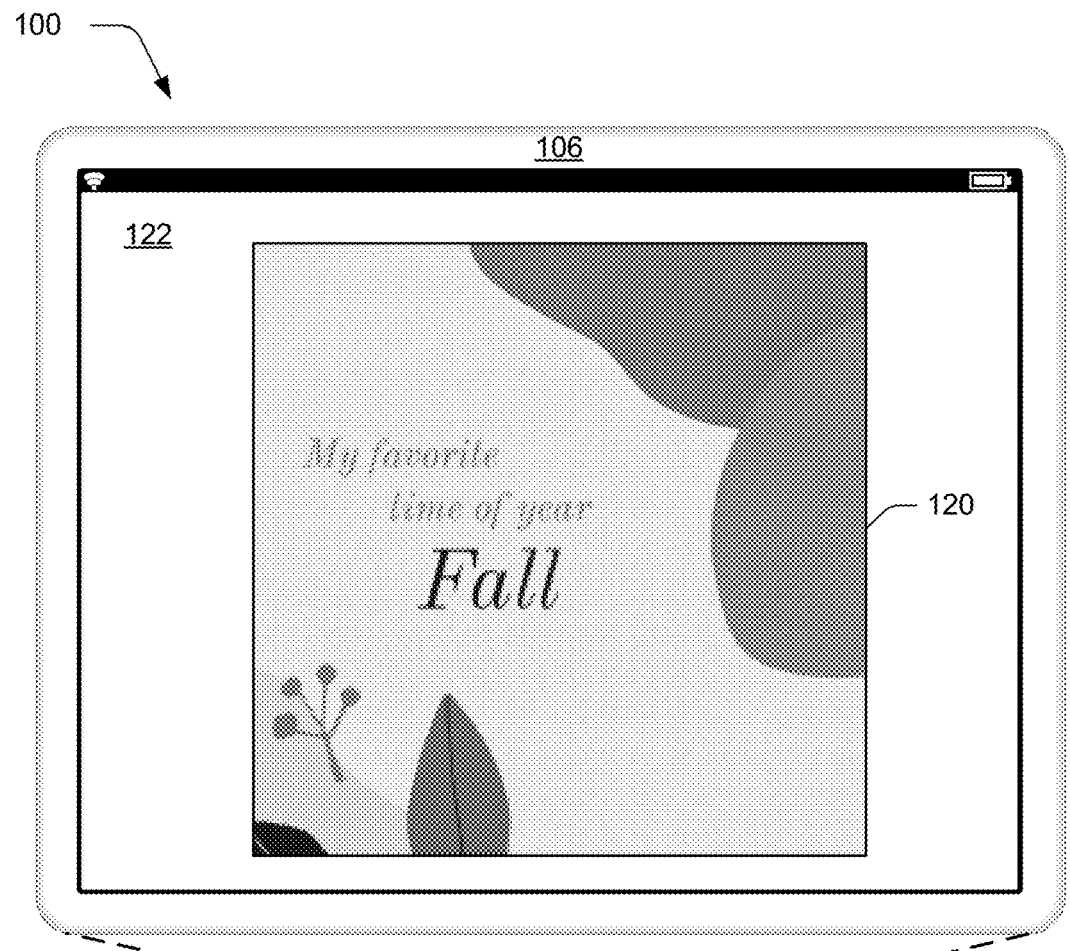
FIG. 1 is an illustration of an environment in an example implementation that is operable to employ digital systems and techniques for identifying templates based on fonts as described herein.
Figure 1:
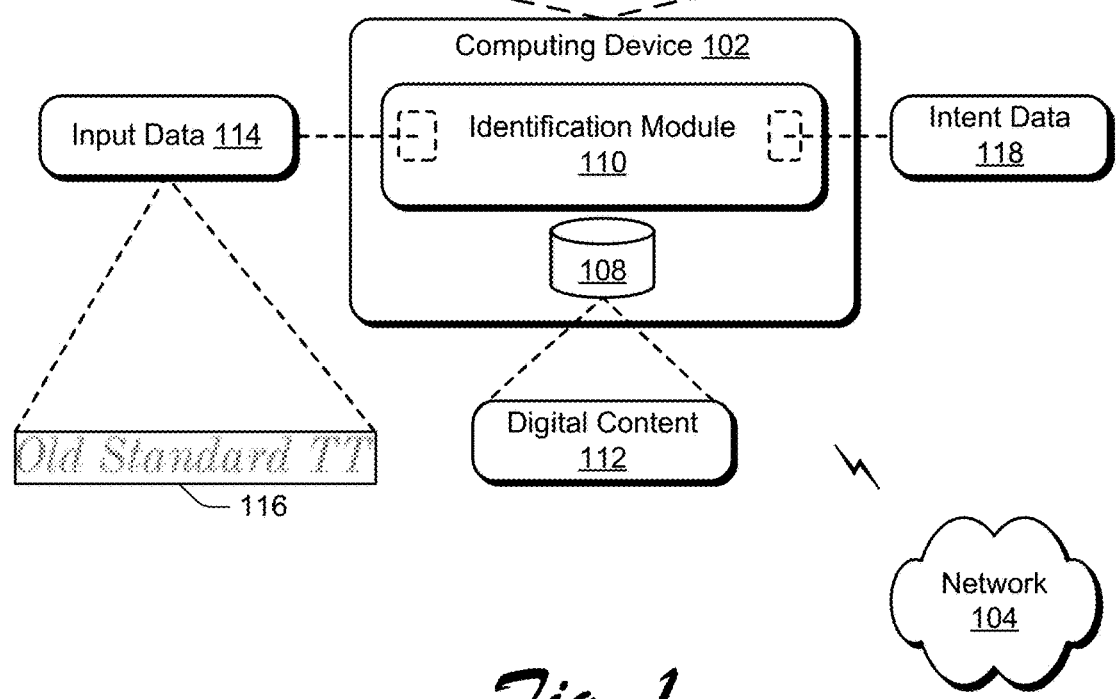

A font is a first type of creative asset which is usable to render glyphs of text in other types of creative assets such as digital images, digital templates, graphic artwork, and electronic documents. Typically, fonts are made available to users via a network as part of a collection of fonts that includes thousands of different fonts. A digital template is a second type of creative asset that is usually created by a digital artist as having a set of design elements (e.g., digital images, text elements, and/or scalable vector graphics) arranged in a visually pleasing manner to convey example content such as example text rendered using an example font. Like fonts, digital templates are made available to the users via the network as part of a collection of digital templates that includes thousands of different digital templates.

It is challenging to identify a particular digital template from the thousands of digital templates in the collection for use with a particular font (e.g., to render glyphs of text in the particular digital template using the particular font). This is because fonts and digital templates are different types of creative assets and there is no objective measure of similarity between these different types of creative assets. As a result, conventional systems for identifying the particular digital template are limited to keyword searches of the collection or manually browsing through categories of digital templates which is inefficient and unlikely to result in identification of the particular digital template.

In order to overcome these limitations, techniques and systems for identifying templates based on fonts are described. In an example, a computing device implements an identification system to receive input data, via a network, describing a selection of a font included in a collection of fonts. The identification system generates an embedding that represents the font in a latent space using a machine learning model trained on training data to generate embeddings for digital templates and fonts in the latent space.

For example, the machine learning model includes a convolutional neural network, and the identification system generates the training data by extracting tags from metadata of fonts included in the collection of fonts and extracting intent phrases from metadata of digital templates included in a collection of digital templates. The tags describe the fonts such as "calligraphy," "comic," "clean," etc. Similarly, the intent phrases describe the digital templates such as "pink," "fancy," "social," and so forth.

The identification system leverages a natural language model (e.g., Word2Vec) trained on a corpus of text to learn relationships between words and identify similar words (e.g., based on semantic similarity) to generate embeddings for the intent phrases and the tags in an embedding space. For example, the natural language model generates the embeddings such that embeddings generated for intent phrases and tags are separated by a relatively small distance in the embedding space if words in the intent phrases are similar to words in the tags. Conversely, the embeddings generated for the intent phrases and the tags are separated by a relatively large distance in the embedding space if words in the intent phrases are not similar to words in the tags.

In one example, the identification system utilizes the distances in the embedding space and also use data describing particular fonts used to render text in particular digital templates to construct triplets that include a training font, a positive digital template, and a negative digital template. For instance, the positive digital template is identified for the training font as having corresponding embeddings separated by a relatively small distance in the embedding space or from the use data describing a use of the training font to render glyphs of text in the positive digital template. Similarly, the negative digital template is identified for the training font as having corresponding embeddings separated by a relatively large distance in the embedding space or from the use data describing the training font as being discarded from a use in the negative digital template (e.g., the training font is recommended and declined or considered for use and discarded after consideration).

For example, the identification system trains the machine learning model on the training data using a triplet loss and leverages the trained machine learning model to address a "cold start" problem for a neural collaborative filtering model. The neural collaborative filtering model represents an item as a combination of a representation of a font and a representation of a digital template. In one example, the representation of the font is based on tags, a deep font vector, font metrics data, and font class features while the representation of the digital template is based on intent phrases, a layout type, fonts used, colors used, and text used. The "cold start" problem generally refers to a scenario in which the neural collaborative filtering model does not have enough information (e.g., is not trained) to accurately identify items.

In order to address this "cold start," the identification system identifies a digital template included in the collection of digital templates based on the embedding that represents the font in the latent space (e.g., generated by the trained machine learning model) and an embedding that represents the digital template in the latent space. For instance, the embeddings are separated by a relatively small distance in the latent space. The identification system generates an indication of the digital template for display in a user interface (e.g., of a user that selected the font described by the input data).

In some examples, the identification system receives interaction data describing an interaction relative to the indication of the digital template. In these examples, the identification system trains the neural collaborative filtering model on additional training data based on the interaction data using a focal loss. After the neural collaborative filtering model is trained on the interaction data (e.g., after the "cold start"), the identification system implements the trained neural collaborative filtering model to identify digital templates based on fonts by identifying items based on identifiers (e.g., associated with users of the collection of fonts and the collection of digital templates).

The described systems are capable of identifying a particular digital template based on a font even though fonts and digital templates are different types of creative assets. This is not possible in conventional systems which are limited to identifying digital templates based on keyword searches and browsing categories of the digital templates which is inefficient and unlikely to result in identification of the particular template. The described systems are able to overcome the "cold start" problem initially and also as new fonts are added to the collection of fonts and new digital templates are added to the collection of digital templates. By learning relationships between fonts and templates, the described systems are capable of mapping lower level intents of fonts to higher level intents of digital templates (e.g., to predict and surface likely modifications to a digital template based on a font) which is also not possible using conventional systems.

Term Examples

As used herein, the term "machine learning model" refers to a computer representation that is tunable (e.g., trainable) based on inputs to approximate unknown functions. By way of example, the term "machine learning model" includes a model that utilizes algorithms to learn from, and make predictions on, known data by analyzing the known data to learn to generate outputs that reflect patterns and attributes of the known data. According to various implementations, such a machine learning model uses supervised learning, semi-supervised learning, unsupervised learning, reinforcement learning, and/or transfer learning. For example, the machine learning model is capable of including, but is not limited to, clustering, decision trees, support vector machines, linear regression, logistic regression, Bayesian networks, random forest learning, dimensionality reduction algorithms, boosting algorithms, artificial neural networks (e.g., fully-connected neural networks, deep convolutional neural networks, or recurrent neural networks), deep learning, etc. By way of example, a machine learning model makes high-level abstractions in data by generating data-driven predictions or decisions from the known input data.

As used herein, the term "embedding" refers to a numerical representation of a word or multiple words in an embedding space. By way of example, embeddings for words and embeddings for other words that are generated by a trained natural language model are comparable to infer similarities and differences between the words and the other words.

As used herein, the term "intent phrase" refers to a word associated with a font that describes the font or a word associated with a digital template that describes the digital template. Examples of intent phrases associated with a particular font include "clean," "funky," "rounded," etc. Examples of intent phrases associated with a particular digital template include "pink," "fancy," "cocktail," and so forth.

In the following discussion, an example environment is first described that employs examples of techniques described herein. Example procedures are also described which are performable in the example environment and other environments. Consequently, performance of the example procedures is not limited to the example environment and the example environment is not limited to performance of the example procedures.

Example Environment

FIG. 1 is an illustration of an environment 100 in an example implementation that is operable to employ digital systems and techniques as described herein. The illustrated environment 100 includes a computing device 102 connected to a network 104. The computing device 102 is configurable as a desktop computer, a laptop computer, a mobile device (e.g., assuming a handheld configuration such as a tablet or mobile phone), and so forth. Thus, the computing device 102 is capable of ranging from a full resource device with substantial memory and processor resources (e.g., personal computers, game consoles) to a low-resource device with limited memory and/or processing resources (e.g., mobile devices). In some examples, the computing device 102 is representative of a plurality of different devices such as multiple servers utilized to perform operations "over the cloud."

The illustrated environment 100 also includes a display device 106 that is communicatively coupled to the computing device 102 via a wired or a wireless connection. A variety of device configurations are usable to implement the computing device 102 and/or the display device 106. The computing device 102 includes a storage device 108 and an identification module 110. The storage device 108 is illustrated to include digital content 112 such as digital images, graphic artwork, electronic documents, etc.

In some examples, the digital content 112 includes font files of fonts included in a collection of fonts (e.g., a font database) that is available via the network 104 and digital templates of a collection of digital templates (e.g., a template database) that is also available via the network 104. The fonts are a first type of creative asset which are usable to render glyphs of text in other types of creative assets such as the digital images, the graphic artwork, and the electronic documents. The collection of fonts includes thousands of different types of fonts which are browsable in groups (e.g., by viewing images depicting glyphs rendered using the fonts) and searchable (e.g., using keyword searches).

The digital templates are a second type of creative asset which are typically created by a digital artist as having a set of design elements (e.g., digital images, text elements, and scalable vector graphics) arranged in a visually pleasing manner to convey example content such as example text rendered using an example font. The collection of digital templates includes thousands of digital templates such as templates for flyers, menus, resumes, posts, logos, thumbnails, collages, business cards, greeting cards, invitations, brochures, album covers, worksheets, book covers, etc. Like the fonts included in the collection of fonts, the digital templates included in the collection of digital templates are browsable in categories (e.g., by viewing images depicting the templates) and searchable (e.g., using keyword searches).

In general, any of the fonts included in the collection of the fonts is usable to render glyphs of text in any of the digital templates included in the collection of digital templates. However, in practical applications, it is challenging to identify a particular digital template from the thousands of digital templates for use with a particular font (e.g., to render glyphs of text in the particular digital template using the particular font). This is because fonts and digital templates are different types of creative assets and there is no objective measure of similarity between these different types of creative assets.

Consider an example in which the identification module 110 is capable of identifying digital templates based on fonts. In this example, the identification module 110 is illustrated as having, receiving, and/or transmitting input data 114 which describes a font 116. For example, a user interacts with an input device (e.g., a mouse, a stylus, a keyboard, a touchscreen, etc.) to select the font 116 from the collection of fonts available via the network 104.

In the illustrated example, the font 116 is Old Standard TT Italic, and the user selects the font 116 to render glyphs of text in a digital template included in the collection of digital templates available via the network 104. In this example, identifying a particular digital template for use with the font 116 (e.g., via keyword searches for templates and/or browsing different categories of templates) is burdensome to the user. In order to identify a template for use with the font 116, the user interacts with the input device to transmit the input data 114 to the identification module 110, e.g., via the network 104.

The identification module 110 receives and processes the input data 114 to identify the font 116 and also receives and processes intent data 118 that describes intent phrases (e.g., tags) associated with fonts included in the collection of fonts (including the font 116) and intent phrases associated with templates included in the collection of digital templates. For instance, the identification module 110 includes a machine learning model trained on training data to generate embeddings for fonts and templates in a latent space such that embeddings generated for a template and embeddings generated for a font are separated by a relatively small distance in the latent space if intent phrases associated with the template are semantically similar to intent phrases (e.g., tags) associated with the font. In one example, the machine learning model includes a convolutional neural network and the training data describes triplets that include a training font, a positive digital template for the training font, and a negative digital template for the training font. In some examples, the training data is generated based on use data (e.g., particular fonts used with particular digital templates), geo-seasonal data, popularity data (e.g., popular fonts and/or popular digital templates), and so forth.

For example, the identification module 110 implements the machine learning model based on the input data 114 to identify a digital template 120 as being associated with intent phrases that are semantically similar to intent phrases (e.g., tags) associated with the font 116. As shown, the digital template 120 is displayed in a user interface 122 of the display device 106. The digital template 120 includes glyphs of text rendered using the font 116 that state "My favorite time of year Fall." For instance, the glyphs rendered using the font 116 are visually pleasing in the digital template 120 because of a semantic similarity between the intent phrases associated with the template 120 and the intent phrases (e.g., tags) associated with the font 116.

Consider another example in which the identification module 110 also includes a neural collaborative filtering model that represents an item as a combination of a representation of a font (e.g., a deep font vector, font metric data, font classification features, tags etc.) and a representation of a digital template (e.g., using features based on a type of layout, colors used and not used, text used, fonts used, intent phrases, and so forth). In this example, the identification module 110 leverages the machine learning model to address a "cold start" for the neural collaborative filtering model which occurs when the neural collaborative filtering model does not have enough information to accurately identify items. The identification module 110 addresses this "cold start" by identifying pairs of fonts and digital templates based on semantic similarity of intent phrases while training the neural collaborative filtering model to identify items. For example, the identification module 110 trains the neural collaborative filtering model to identify items based on interaction data such as whether or not the user interacts with the input device to use the digital template 120 with the font 116. In an example in which the user completes the digital template 120 by using the font 116 to render glyphs of text in the template 120, the neural collaborative filtering model learns to associate an item (e.g., a combination of a representation of the font 116 and a representation of the digital template 120) with an identifier (e.g., associated with the user).

By leveraging the machine learning model and the neural collaborative filtering model to learn relationships between fonts and digital templates, the identification module 110 is capable of identifying font-template pairs which are impractical or impossible to identify by browsing thousands of fonts in the collection of fonts and thousands of digital templates in the collection of digital templates. For instance, the identification module 110 is capable of identifying the digital template 120 based on the font 116 even though fonts and digital templates are different types of creative assets that exist in different creative domains. By mapping lower level intents of fonts (e.g., tags) to higher level intents of digital templates (e.g., intent phrases), it is possible for the identification module 110 to learn to accurately predict types of changes likely to be made to design elements included in a particular digital template using a particular font such as glyphs of text rendered using the particular font are likely to have a Z-index before (e.g., above) a Z-index of a digital image (e.g., the digital image is a background object relative to the glyphs of text). These predicted changes are surfaced (e.g., to the user) to facilitate faster completion of the particular template which is not possible using conventional systems that are limited to identifying templates via keyword searches and browsing templates by categories.

Figure 2:
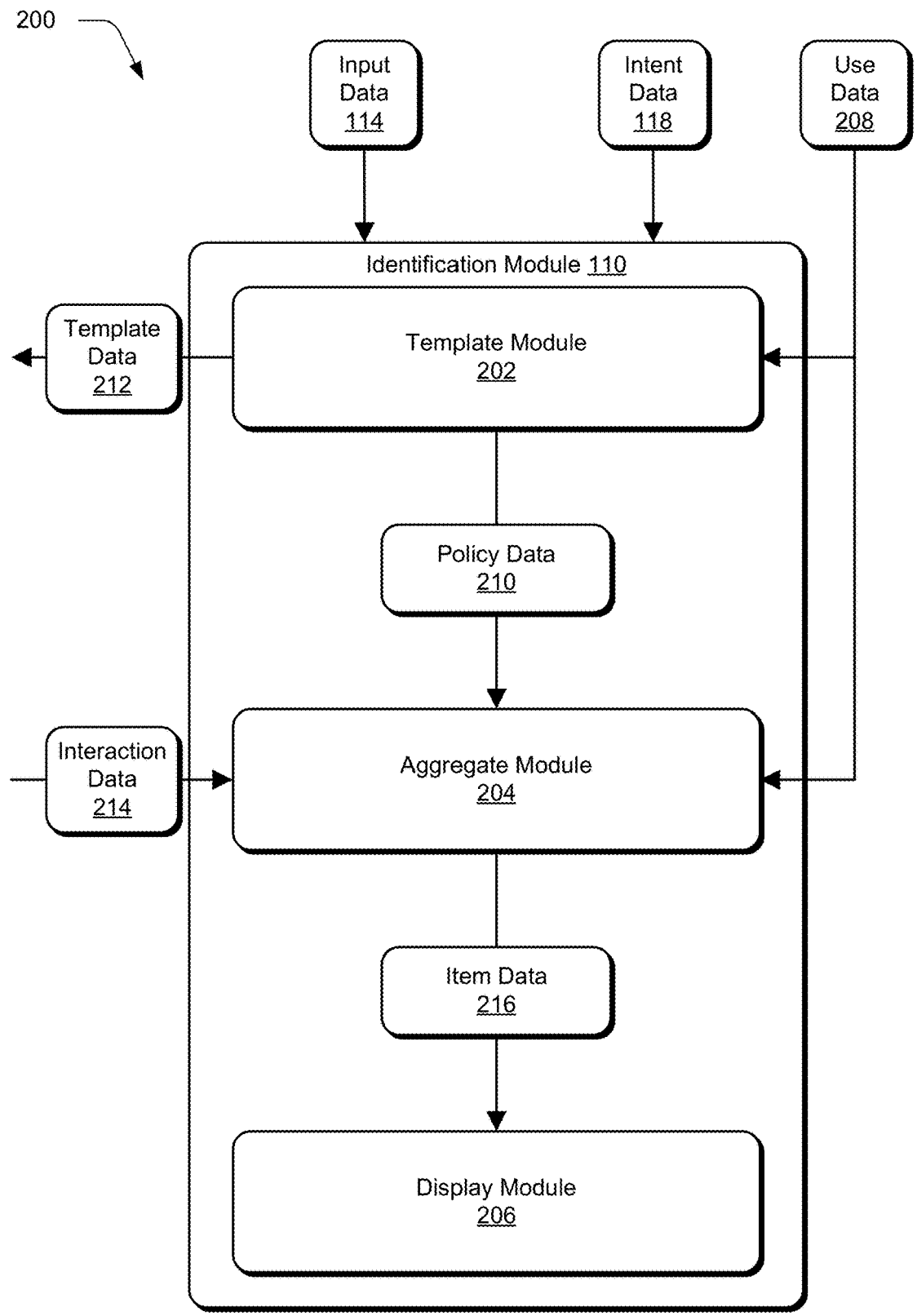
FIG. 2 depicts a system in an example implementation showing operation of an identification module for identifying templates based on fonts.

FIG. 2 depicts a system 200 in an example implementation showing operation of an identification module 110. The identification module 110 is illustrated to include a template module 202, an aggregate module 204, and a display module 206. For instance, the template module 202 receives the input data 114, the intent data 118, and use data 208 as inputs.

Figure 3:
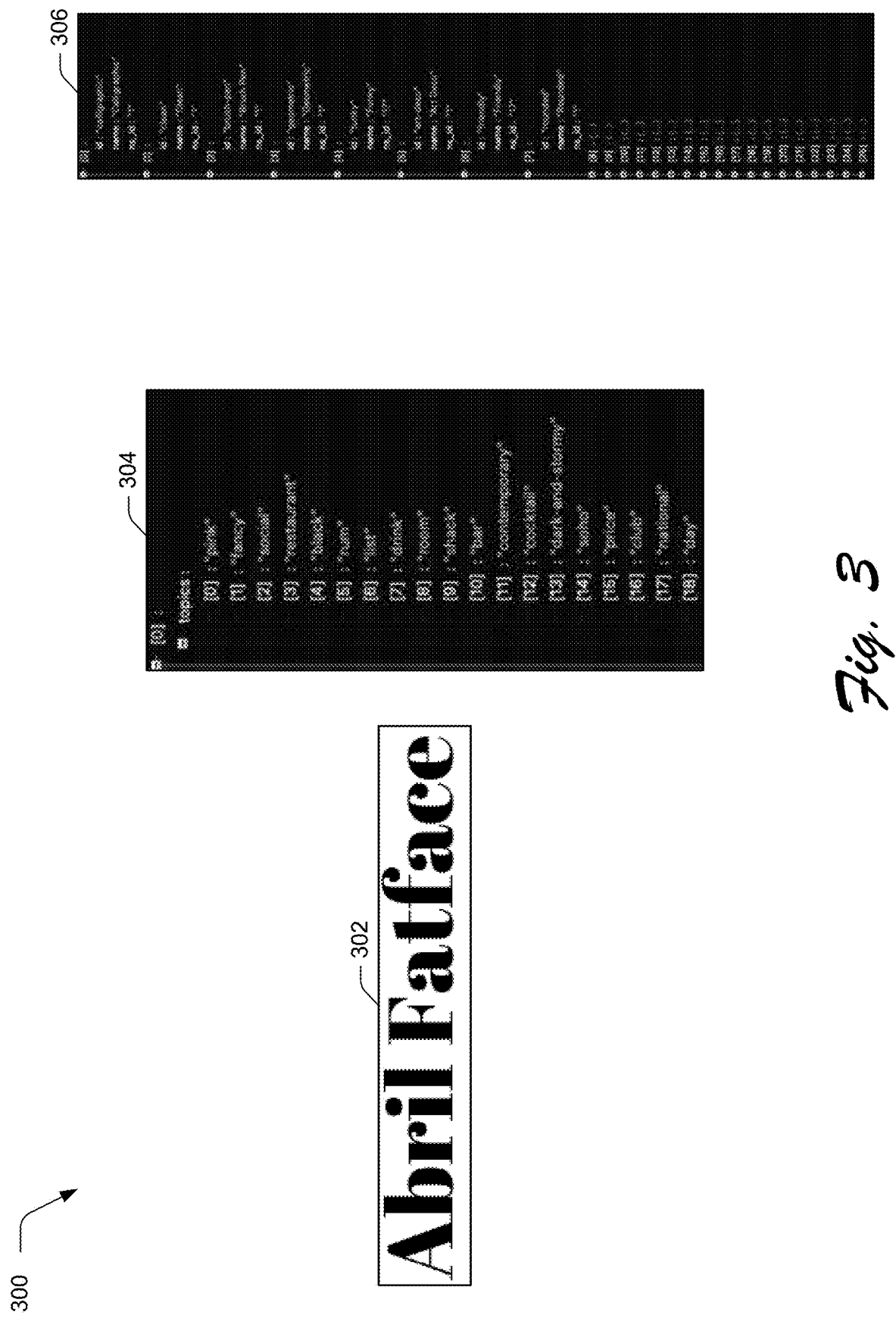
FIG. 3 illustrates a representation of input data and intent data.

FIG. 3 illustrates a representation 300 of input data and intent data. As shown, the representation 300 includes a font 302 that is selected from the thousands of fonts included in the collection of fonts. For example, the input data 114 describes the font 302 which is Abril Fatface. The representation 300 also includes intent phrases 304 that are associated with a digital template and tags 306 that are associated with the font 302. The intent phrases 304 that are associated with the digital template include "fancy," "social," "cocktail," etc. The tags 306 that are associated with the font 302 include "clean," "funky," "friendly," and so forth. In an example, the intent data 118 describes the intent phrases 304 and the tags 306.

Figure 4:
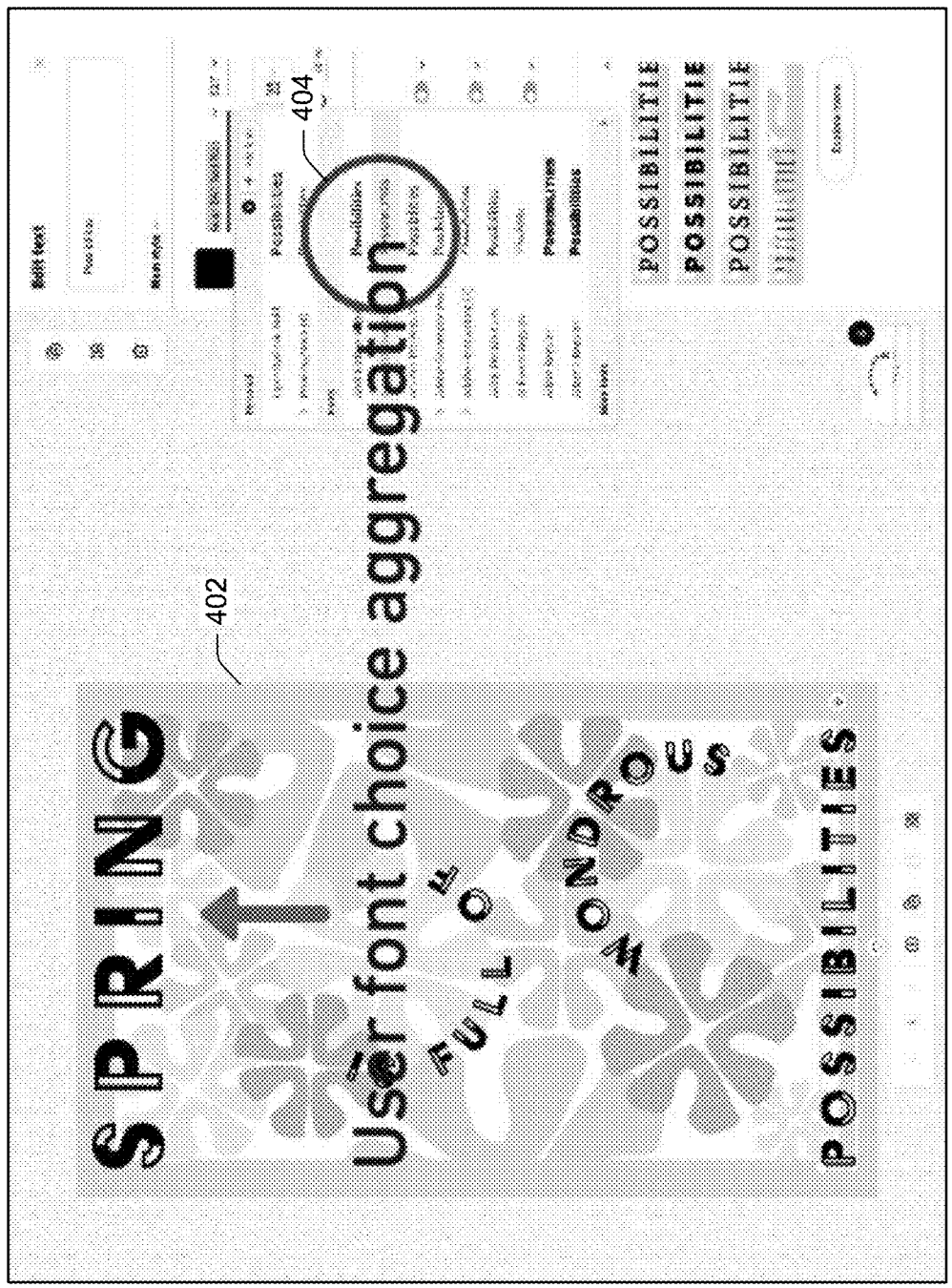
FIG. 4 illustrates a representation of use data.

FIG. 4 illustrates a representation 400 of use data. The representation 400 includes a digital template 402 which is included in the collection of digital templates that is available via the network 104. For example, a user interacts with an input device (e.g., a stylus, a mouse, a keyboard, a microphone, a touchscreen, etc.) relative to the digital template 402 and manipulates the input device to select 404 a font that is included in the collection of fonts. The user selects 404 the font to render glyphs of text in the digital template 402. In an example, the use data 208 describes the selection 404 of the font for use with the digital template 402.

Figure 5:
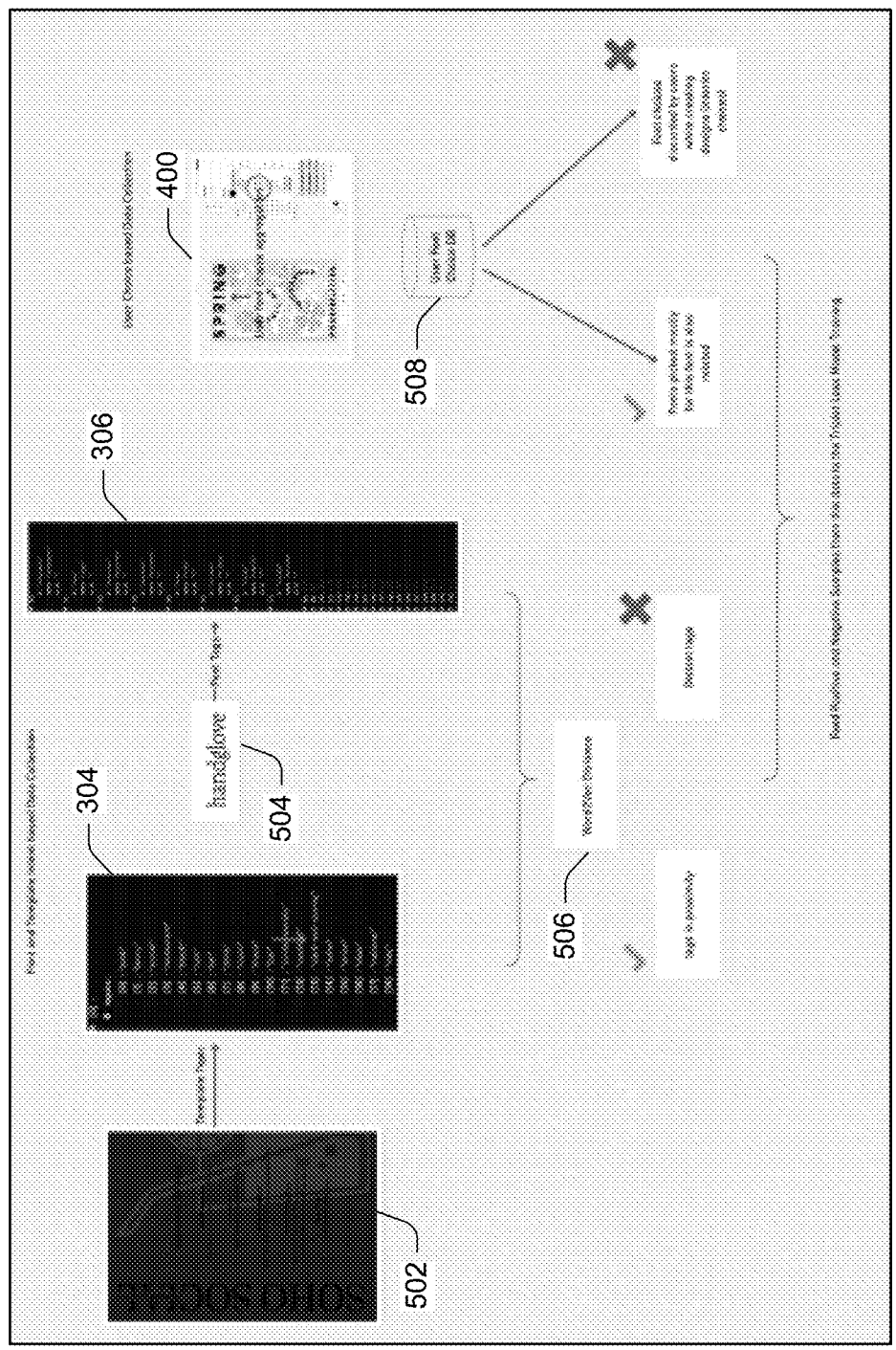
FIG. 5 illustrates a representation of generating training data for training a machine learning model.

For example, the template module 202 receives and processes the intent data 118 and the use data 208 to train a machine learning model such as a convolutional neural network on training data generated based on the intent data 118 and the use data 208. FIG. 5 illustrates a representation 500 of generating training data for training a machine learning model. As shown in the representation 500, the intent data 118 describes the intent phrases 304 which are extracted from metadata of a digital template 502. The digital template 502 is representative of the digital templates included in the collection of digital templates in one example.

For instance, the intent data 118 also describes the tags 306 which are extracted from metadata of a font 504. In an example, the font 504 is representative of the fonts included in the collection of fonts that is available via the network 104. The template module 202 includes a natural language model 506 such as Word2Vec which is trained on a corpus of text to learn word relationships/associations based on words included in the corpus of text. Since the intent phrases 304 and the tags 306 are also text, the template module 202 processes the intent phrases 304 and the tags 306 using the natural language model 506 which identifies associations between the intent phrases 304 and the tags 306 based on similarities between words included in the intent phrases 304 and words included in the tags 306. For example, the natural language model 506 generates embeddings for the intent phrases 304 and embeddings for the tags 306 in an embedding space.

The template module 202 determines an amount of similarity (e.g., an amount of semantic similarity) between the intent phrases 304 and the tags 306 by computing a distance between the embeddings for the intent phrases 304 and the embeddings for the tags 306 in the embedding space. In an example, the template module 202 computes the distance between the embeddings in the embedding space as a cosine distance (e.g., based on cosine similarity). In other examples, the template module 202 computes the distance as a Euclidian distance, a Manhattan distance, a Hamming distance, a Minkowski distance, and so forth. If the computed distance between the embeddings in the embedding space is relatively small, then the template module 202 determines that the intent phrases 304 and the tags 306 are similar Conversely, if the computed distance between the embeddings in the embedding space is relatively large, then the template module 202 determines that the intent phrases 304 and the tags 306 are not similar.

Continuing the previous example, if the intent phrases 304 and the tags 306 are similar, then the digital template 502 is usable as a positive training sample for the font 504. If the intent phrases 304 and the tags 306 are not similar, then the digital template 502 is usable as a negative training sample for the font 504. For example, the template module 202 also leverages a database 508 of the use data 208 to identify positive and negative training samples for fonts.

Consider an example in which the use data 208 included in the database 508 describes the digital template 502 and the font 504. In this example, if the data in the database 508 describes a selection and use of the font 504 to render glyphs of text in the digital template 502, then the template module 202 identifies the digital template 502 as a positive training sample for the font 504. Alternatively, if the data in the database 508 describes the font 504 as being discarded from a potential use in the digital template 502 (e.g., the font 504 is recommended but declined or the font 504 was considered as a candidate for use in the template 502 and then discarded after the consideration), then the template module 202 identifies the digital template 502 as a negative training sample for the font 504.

In some examples, the template module 202 curates negative training samples for the font 504. To do so in one example, the template module 202 randomly selects the digital template 502 from the collection of thousands of digital templates for use as a negative training sample for the font 504. In another example, the template module 202 randomly selects the font 504 from the collection of thousands of fonts such that the digital template 502 is usable as a negative training sample for the font 504.

In an example, the template module 202 generates the training data for training the machine learning model by constructing triplets that include a training font, a positive digital template for the training font, and a negative digital template for the training font. The template module 202 then trains the machine learning model on the training data using a triplet loss which is representable as:

$$\mathcal{L} = \max\{\|f(x_i) - f(x_j)\|^2 - \|f(x_i) - f(x_k)\|^2 + \alpha, 0\}$$

where: $x_i$, $x_j$, and $x_k$ are each digital images; $f(x_i)$, $f(x_j)$, and $f(x_k)$ are corresponding embeddings; and $\alpha$ is a margin.

The machine learning model learns to generate embeddings in a latent space for fonts and digital templates such that fonts and digital templates having similar tags 306 and intent phrases 304, respectively, are separated by a relatively small distance in the latent space based on the training. For instance, based on the training, the machine learning model also learns to generate embeddings in the latent space for fonts and digital templates such that fonts and digital templates having dissimilar tags 306 and intent phrases 304, respectively, are separated by a relatively large distance in the latent space. Once trained on the training data, the machine learning model is capable of distinguishing between different fonts and accurately matching fonts that are similar to training fonts with digital templates that are similar to positive digital templates for the training fonts.

Figure 6:
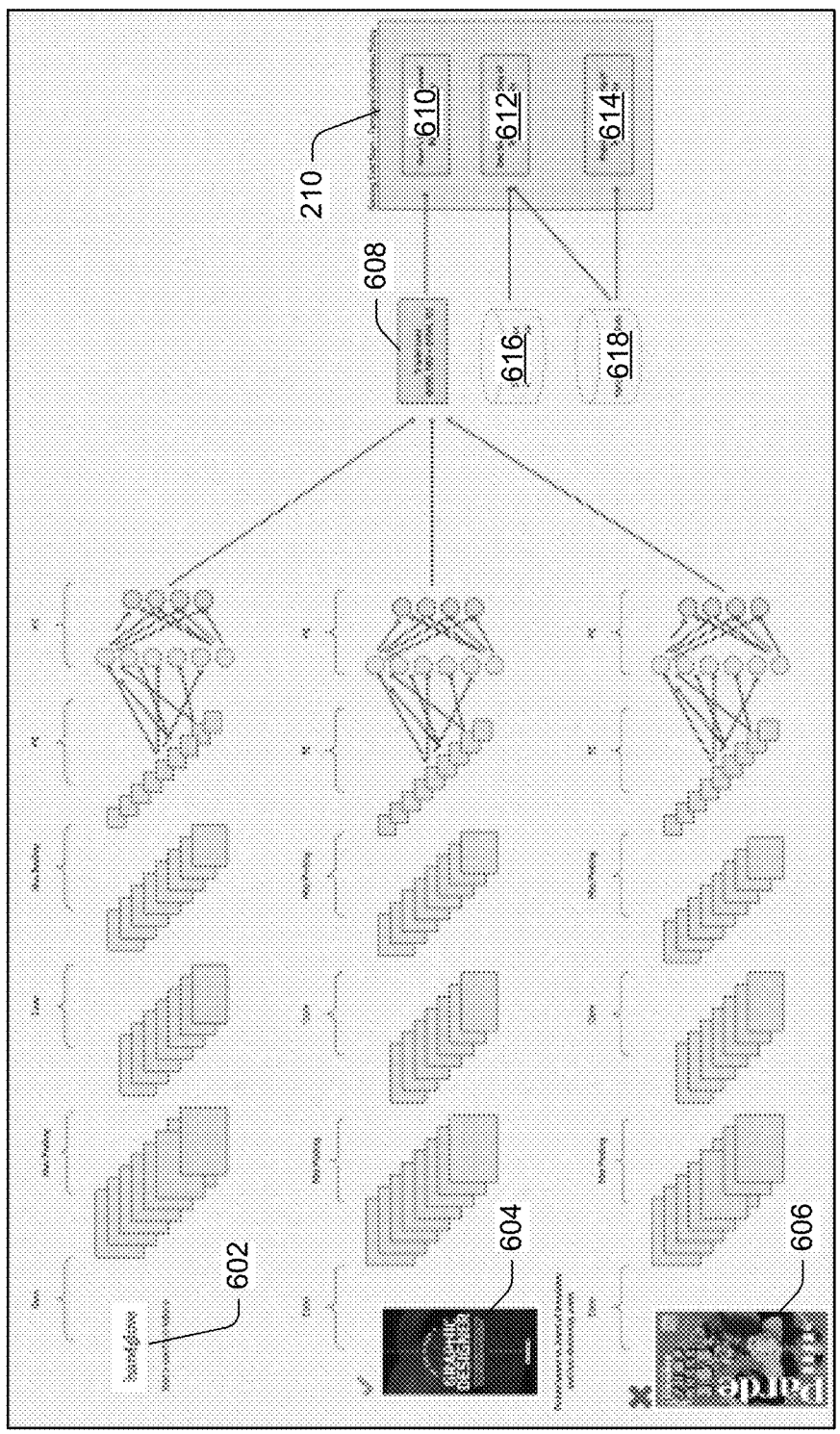
FIG. 6 illustrates a representation of generating policy data using a trained machine learning model.

FIG. 6 illustrates a representation 600 of generating policy data using a trained machine learning model. The representation 600 includes an illustration of the machine learning model included in the template module 202 which receives the input data 114 describing a selection of a font 602 from the collection of thousands of fonts. In one example, the user interacts with the input device to select the font 602 from the collection of fonts available via the network 104. In some examples, the template module 202 extracts tags 306 from the font 602 and the machine learning model processes the tags 306 to generate an embedding that represents the font 602 in the latent space. For example, the template module 202 compares the embedding that represents the font 602 to an embedding that represents a digital template 604 generated by the machine learning model based on a distance between the embeddings in the latent space.

In the illustrated example, the digital template 604 is similar to the font 602 (e.g., embeddings for the font 602 are separated from embeddings for the digital template 604 by a relatively small distance in the latent space). In this example, the digital template 606 is not similar to the font 602 (e.g., embeddings for the font 602 are separated from embeddings for the digital template 606 by a relatively large distance in the latent space). By minimizing a loss 608 (e.g., the triplet loss), the trained machine learning model identifies the digital template 604 for the font 602 and does not identify the digital template 606 for the font 602. For example, the template module 202 identifies the digital template 604 and does not identify the digital template 606 based on distances between the embedding that represents the font 602 and the embeddings that represent the digital templates 604, 606, respectively in the latent space.

As shown in the representation 600, the template module 202 generates data describing the font 602, the digital template 604, and an identifier associated with the user that selected the font 602 from the collection of fonts to construct a modeling policy 610. For instance, the modeling policy 610 is described by policy data 210 along with a geo-seasonal policy 612 and a popularity policy 614. In some examples, the template module 202 generates the policy data 210 based on the use data 208. For example, the use data 208 includes template-user data 616 and template-export data 618. The template-user data 616 describes identifiers of users and corresponding digital templates and the template-export data 618 describes digital templates and corresponding fonts.

Consider an example in which the template module 202 generates the policy data 210 by also generating template data 212. In this example, the user interacts with the input device to select the font 302 from the collection of fonts via the network 104. Based on this interaction, the template module 202 receives the input data 114 as describing the identifier of the user and the font 302 via the network 104. In response to receiving the input data 114, the template module 202 generates the template data 212 for transmission via the network 104.

Figure 7:
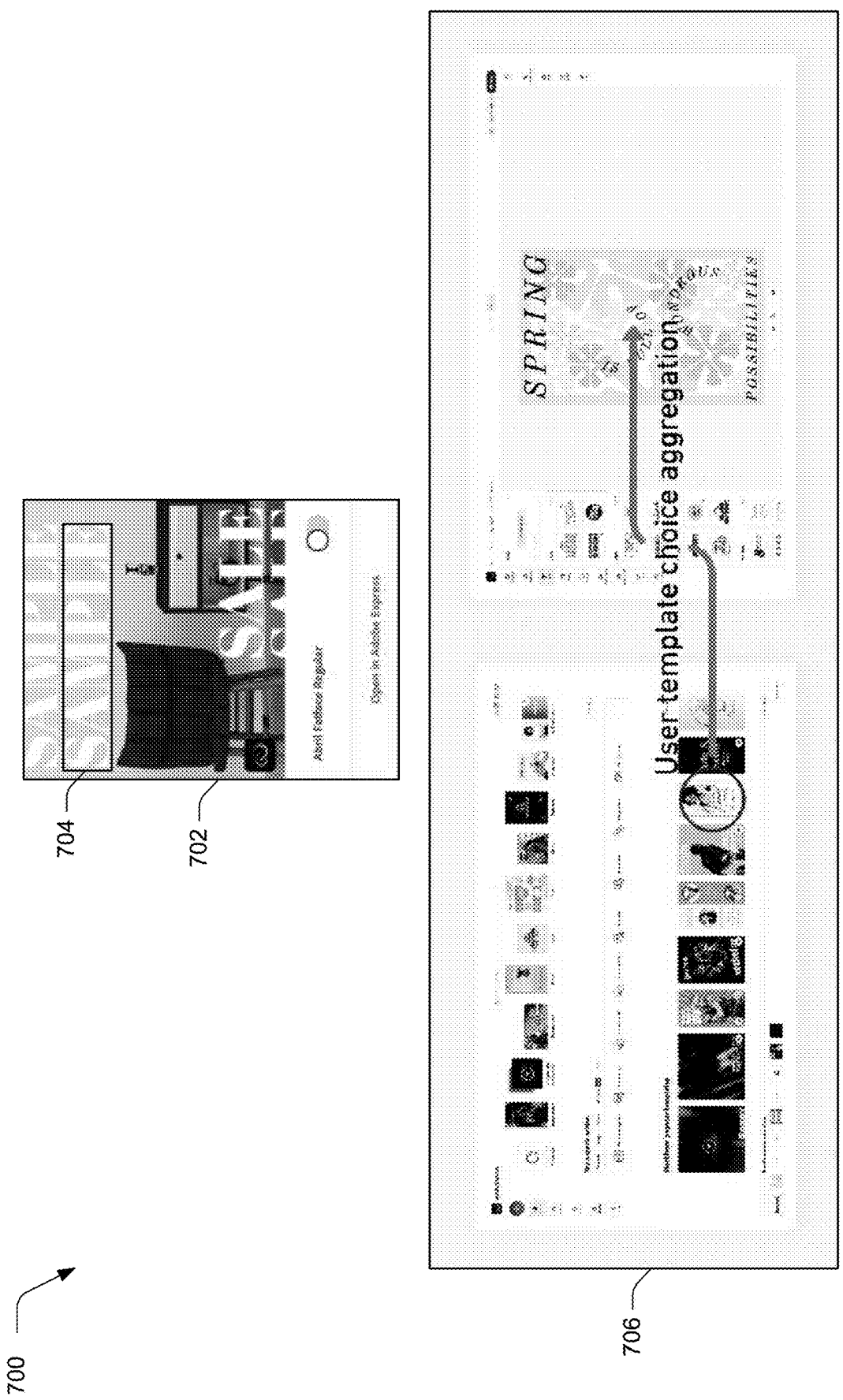
FIG. 7 illustrates a representation of template data and interaction data.

FIG. 7 illustrates a representation 700 of template data and interaction data. In order to generate the template data 212, the template module 202 updates the modeling policy 610 based on the font 302 and the identifier of the user that selected the font 302 from the collection of fonts. For example, the template module 202 implements the trained machine learning model to process the font 302 (e.g., based on the training data and the training) to identify a digital template 702 which is included in the collection of digital templates available via the network 104.

For instance, words included in intent phrases 304 extracted from metadata of the digital template 702 are semantically similar to words included in the tags 306 extracted from the font 302. In an example, the template module 202 updates the template-user data 616 based on the digital template 702 and the identifier of the user that selected the font 302. In this example, updating the template-user data 616 also updates the geo-seasonal policy 612 described by the policy data 210. The template module 202 generates the template data 212 as describing an indication of the digital template 702, and the template module 202 transmits the template data 212 via the network 104 to cause the indication of the digital template 702 to be displayed to the user that selected the font 302 from the collection of fonts.

In some examples, the template module 202 causes the indication of the digital template 702 to be displayed to the user relative to the collection of fonts. Consider an example in which the user manipulates the input device to interact with or select the indication of the digital template 702. In this example, the template module 202 receives the use data 208 as describing the user's interaction with or selection of the indication of the digital template 702. In response to receiving and processing the use data 208 describing the selection of the indication of the digital template 702, the template module 202 generates the template data 212 as describing an editable version of the digital template 702 that includes a text element 704 having glyphs of example text rendered using the font 302. As shown in the representation, the example text states "SAMPLE."

Continuing the example, the template module 202 transmits the template data 212 via the network 104 to cause the editable version of the digital template 702 to be displayed to the user, e.g., as part of a content creation journey for the user. In one example, the template module 202 causes the editable version of the digital template 702 to be displayed to the user relative to the collection of digital templates. In this example, the user interacts with the input device relative to the editable version of the digital template 702 to replace the glyphs of the example text in the text element 704.

For instance, the user replaces the example text with substantive text rendered using the font 302 and the user exports (e.g., completes) the editable version of the digital template 702 having the substantive text rendered using the font 302 in the text element 704. The template module 202 receives the use data 208 as describing the exported (e.g., completed) editable version of the digital template 702 with the substantive text rendered using the font 302. In response to receiving and processing the use data 208, the template module 202 updates the template-export data 618 based on the exported digital template 702 and the font 302 used to render the substantive text in the text element 704. For example, updating the template-export data 618 also updates the geo-seasonal policy 612 and the popularity policy 614 described by the policy data 210.

The aggregate module 204 receives the use data 208 and the policy data 210 describing the modeling policy 610, the geo-seasonal policy 612, and the popularity policy 614. In an example, the aggregate module 204 includes a neural collaborative filtering model and the aggregate module 204 addresses a "cold start" problem for the neural collaborative filtering model using the policy data 210. In general, the "cold start" problem for the neural collaborative filtering model refers to a scenario in which the neural collaborative filtering model initially does not have enough information or training data (e.g., described by the use data 208) to accurately identify an item. The aggregate module 204 addresses this "cold start" problem by using the policy data 210 as a substitute for the information or training data which is not yet available to the neural collaborative filtering model.

Consider an example in which the aggregate module 204 receives interaction data 214 as describing an interaction 706. In this example, the user manipulates the input device to perform the interaction 706 by selecting a font from the collection of fonts. For example, the interaction data 214 describes the interaction 706 including an identifier of the user that performed the interaction 706 and the selected font. In an example in which the neural collaborative filtering model is in the "cold start," the aggregate module 204 identifies a digital template based on the policy data 210 and the selected font. In this example, the aggregate module 204 uses the interaction data 214 to train the neural collaborative filtering model.

Consider an example in which the aggregate module 204 trains the neural collaborative filtering model using instances of the interaction data 214 describing fonts selected from the collection of fonts that are used to render glyphs in digital templates from the collection of digital templates. In one example, the aggregate module 204 trains the neural collaborative filtering model on an instance of the interaction data 214 if the instance describes an exported or completed digital template selected from the collection of digital templates having glyphs of text rendered using a font selected from the collection of fonts that is available via the network 104. Although the aggregate module 204 trains the neural collaborative filtering model using instances of the interaction data 214, the aggregate module 204 leverages the use data 208 to implement the trained neural collaborative filtering model (e.g., for inference) in some examples. In these examples, the use data 208 describes all available data describing use of fonts included in the collection of fonts.

Figure 8:
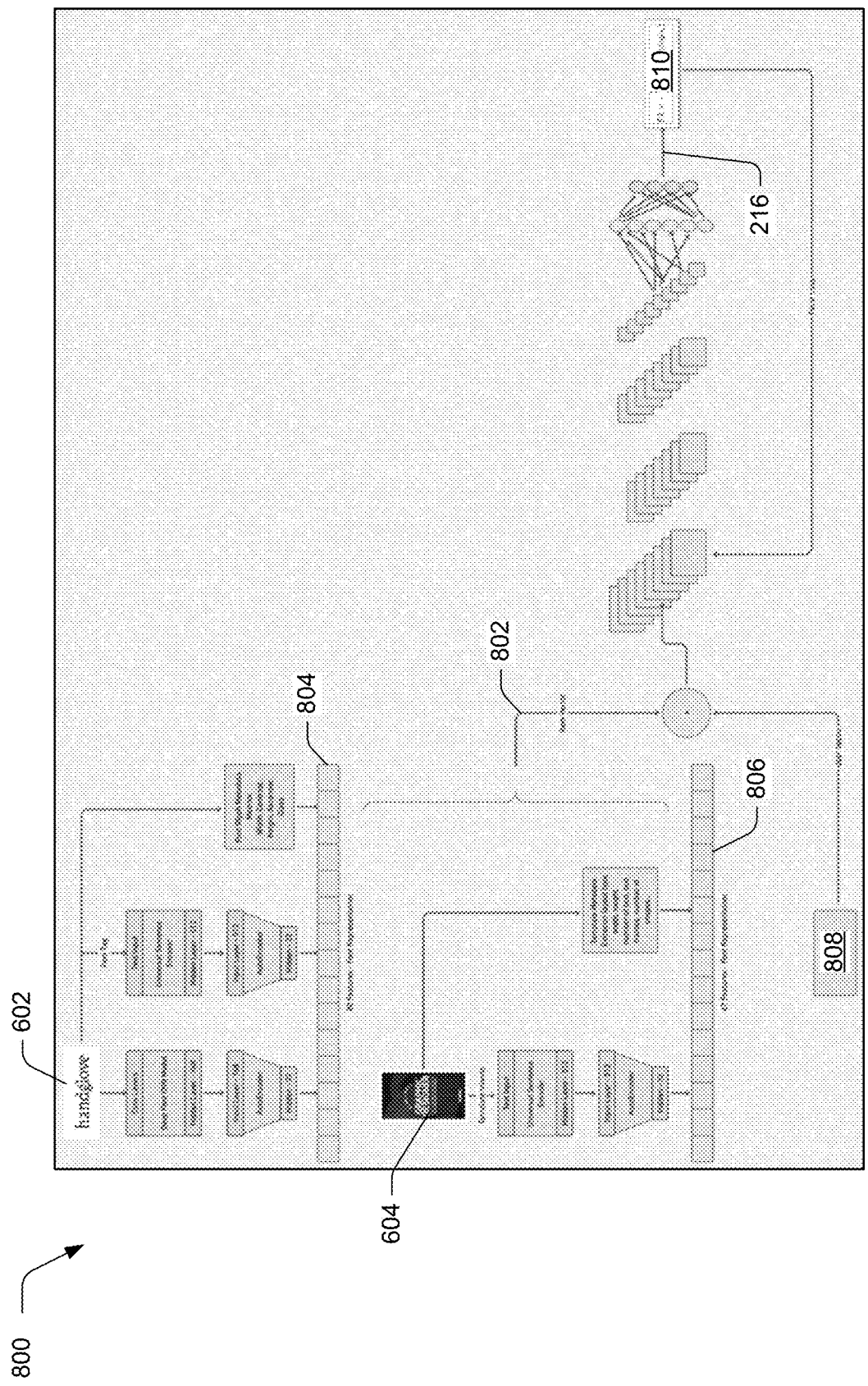
FIG. 8 illustrates a representation of generating item data using a trained neural collaborative filtering model.

In an example in which the neural collaborative filtering model is trained and no longer in the "cold start," the aggregate module 204 uses the trained neural collaborative filtering model to identify a digital template, e.g., based on the identifier of the user that performed the interaction 706 described by the interaction data 214. FIG. 8 illustrates a representation 800 of generating item data using a trained neural collaborative filtering model. The representation 800 includes the neural collaborative filtering model which is illustrated as representing the font 602 and the digital template 604 as an item 802. In an example, the neural collaborative filtering model represents the font 602 as features 804 based on tags 306, a deep font vector, font metrics data, and font class features. In this example, the neural collaborative filtering model represents the digital template 604 as features 806 based on intent phrases 304, a layout type, fonts used, colors used, and text used.

For instance, the neural collaborative filtering model concatenates or combines the features 804 and the features 806 to represent the item 802. Using the item 802 and an identifier 808, the neural collaborative filtering model is trained based on a focal loss 810. In one example, the focal loss 810 resolves a class imbalance problem by making the loss implicitly focus in problematic embedding spaces. Returning to the example in which the aggregate module 204 and/or the trained neural collaborative filtering model receives the interaction data 214 as describing the interaction 706, the identifier of the user that performed the interaction 706, and the selected font, the trained neural collaborative filtering model identifies a digital template by identifying an item (e.g., that is generated based on a representation of the digital template) based on the identifier of the user that performed the interaction 706. In a first example, the trained neural collaborative filtering model identifies the digital template by processing the identifier of the user that performed the interaction 706. In a second example, the trained neural collaborative filtering model identifies the digital template by processing the identifier of a user that is similar to the user that performed the interaction 706. For instance, the aggregate module 204 generates item data 216 as describing the item and/or the digital template. The display module 206 receives and processes the item data 216 to cause an indication of the digital template to be displayed to the user that performed the interaction 706 described by the interaction data 214.

In general, functionality, features, and concepts described in relation to the examples above and below are employed in the context of the example procedures described in this section. Further, functionality, features, and concepts described in relation to different figures and examples in this document are interchangeable among one another and are not limited to implementation in the context of a particular figure or procedure. Moreover, blocks associated with different representative procedures and corresponding figures herein are applicable individually, together, and/or combined in different ways. Thus, individual functionality, features, and concepts described in relation to different example environments, devices, components, figures, and procedures herein are usable in any suitable combinations and are not limited to the particular combinations represented by the enumerated examples in this description.

Example Procedures

Figure 9:
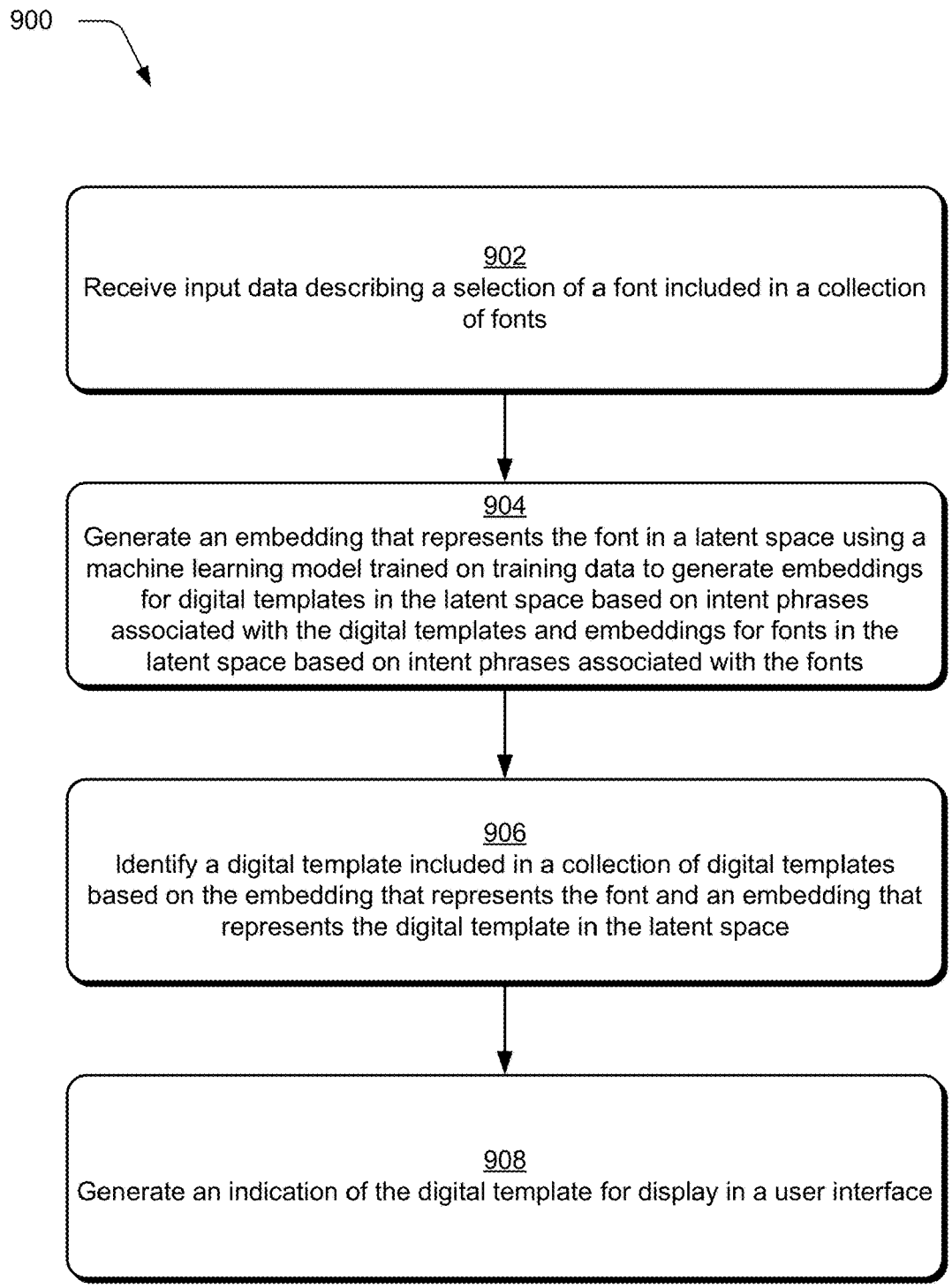
FIG. 9 is a flow diagram depicting a procedure in an example implementation in which input data is received and a digital template is identified based on the input data.

The following discussion describes techniques which are implementable utilizing the previously described systems and devices. Aspects of each of the procedures are implementable in hardware, firmware, software, or a combination thereof. The procedures are shown as a set of blocks that specify operations performed by one or more devices and are not necessarily limited to the orders shown for performing the operations by the respective blocks. In portions of the following discussion, reference is made to FIGS. 1-8. FIG. 9 is a flow diagram depicting a procedure 900 in an example implementation in which input data is received and a digital template is identified based on the input data.

Input data is received describing a selection of a font included in a collection of fonts (block 902). In one example, the computing device 102 implements the identification module 110 to receive the input data. An embedding is generated that represents the font in a latent space using a machine learning model trained on training data to generate embeddings for digital templates in the latent space based on intent phrases associated with the digital templates and embeddings for fonts in the latent space based on intent phrases associated with the fonts (block 904). For example, the identification module 110 generates the embedding that represents the font in the latent space using the machine learning model.

A digital template included in a collection of digital templates is identified based on the embedding that represents the font and an embedding that represents the digital template in the latent space (block 906). The computing device 102 implements the identification module 110 to identify the digital template in some examples. An indication of the digital template is generated for display in a user interface (block 908). In an example, the identification module 110 generates the indication of the digital template for display in the user interface.

Figure 10:
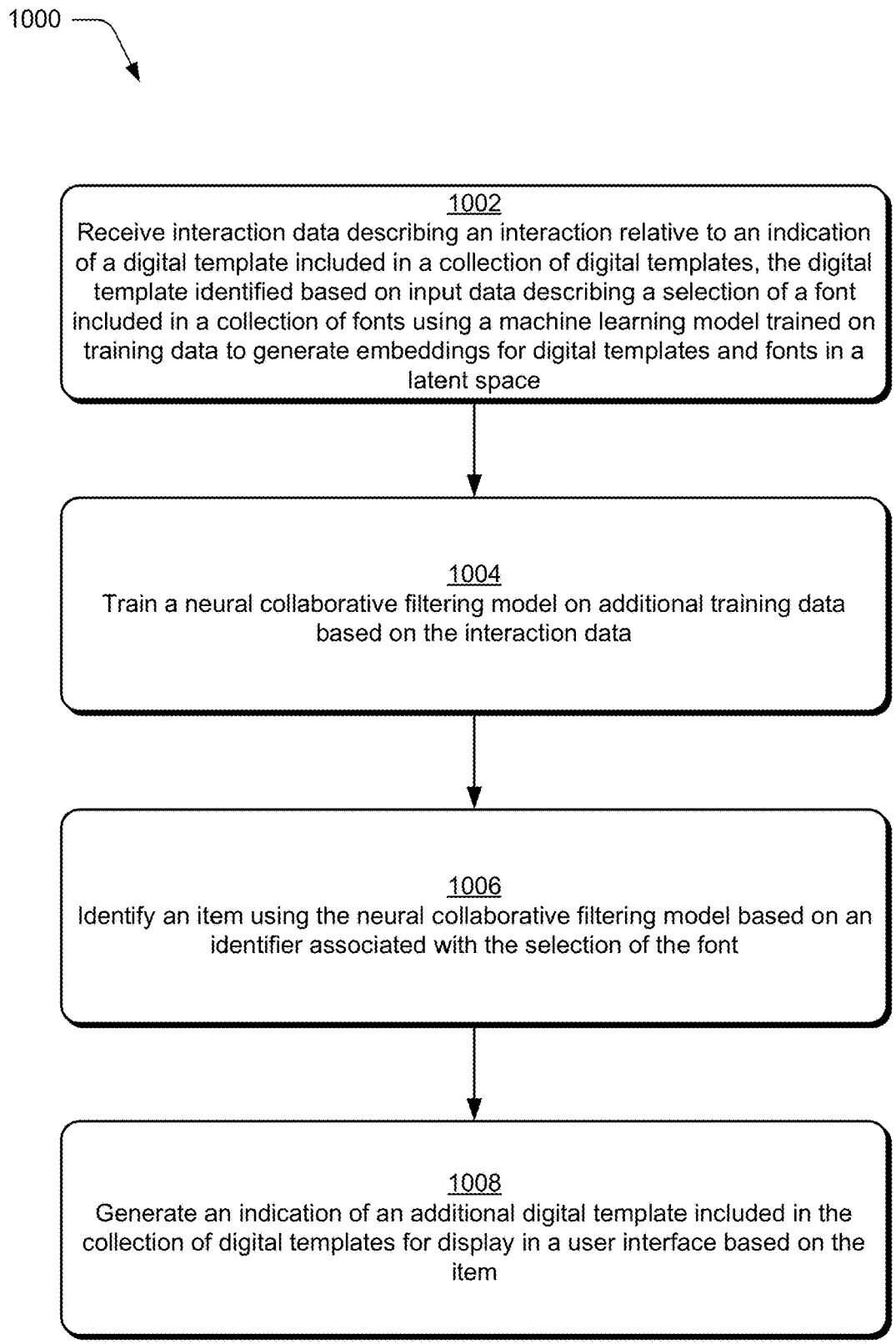
FIG. 10 is a flow diagram depicting a procedure in an example implementation in which an item is identified using a neural collaborative filtering model based on an identifier associated with a selection of a font.

FIG. 10 is a flow diagram depicting a procedure 1000 in an example implementation in which an item is identified using a neural collaborative filtering model based on an identifier associated with a selection of a font. Interaction data is received describing an interaction relative to an indication of a digital template included in a collection of digital templates, the digital template is identified based on input data describing a selection of a font included in a collection of fonts using a machine learning model trained on training data to generate embeddings for digital templates and fonts in a latent space (block 1002). For example, the computing device 102 implements the identification module 110 to receive the interaction data describing the interaction relative to the indication of the digital template.

A neural collaborative filtering model is trained on additional training data based on the interaction data (block 1004). In one example, the identification module 110 trains the neural collaborative filtering model on the additional training data. An item is identified using the neural collaborative filtering model based on an identifier associated with the selection of the font (block 1006). In some examples, the computing device 102 implements the identification module 110 to identify the item using the neural collaborative filtering model. An indication is generated of an additional digital template included in the collection of digital templates for display in a user interface based on the item (block 1008). For example, the identification module 110 generates the indication of the additional digital template for display in the user interface.

Figure 11:
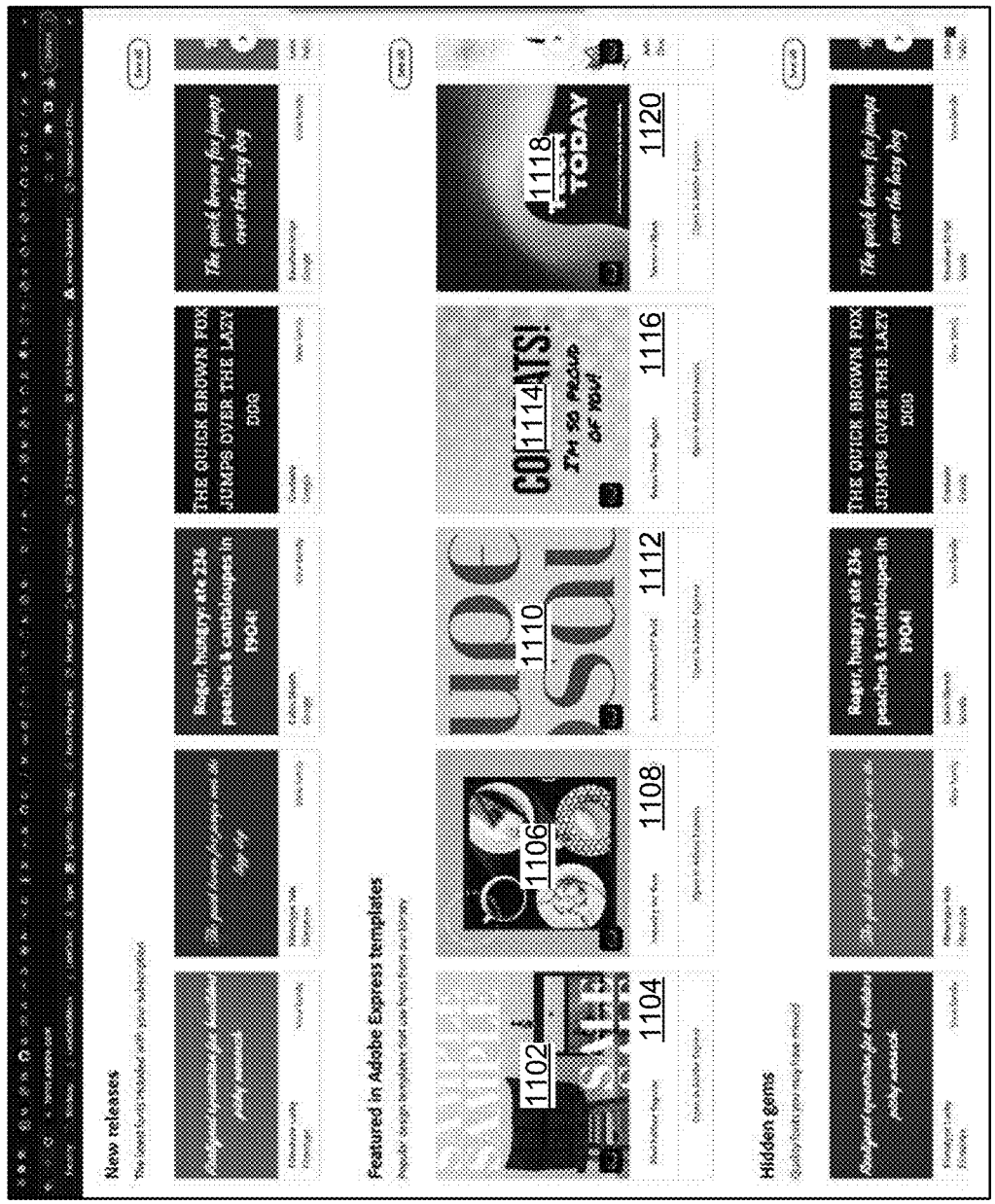
FIG. 11 illustrates an example user interface for identifying templates based on fonts.

FIG. 11 illustrates an example user interface 1100 for identifying templates based on fonts. The user interface 1100 depicts newly released fonts included in the collection of fonts available via the network 104. For example, the user interacts with the input device relative to the user interface 1100 to select a font from the collection of fonts. The identification module 110 displays pairs of digital templates from the collection of digital templates and fonts from the collection of fonts based on identified similarities between the digital templates and the fonts or identified uses of the fonts to render glyphs of text in the digital templates. As shown in the user interface 1100, a digital template 1102 is displayed with a font 1104; a digital template 1106 is displayed with a font 1108; a digital template 1110 is displayed with a font 1112; a digital template 1114 is displayed with a font 1116; and a digital template 1118 is displayed with a font 1120.

Example System and Device

Figure 12:
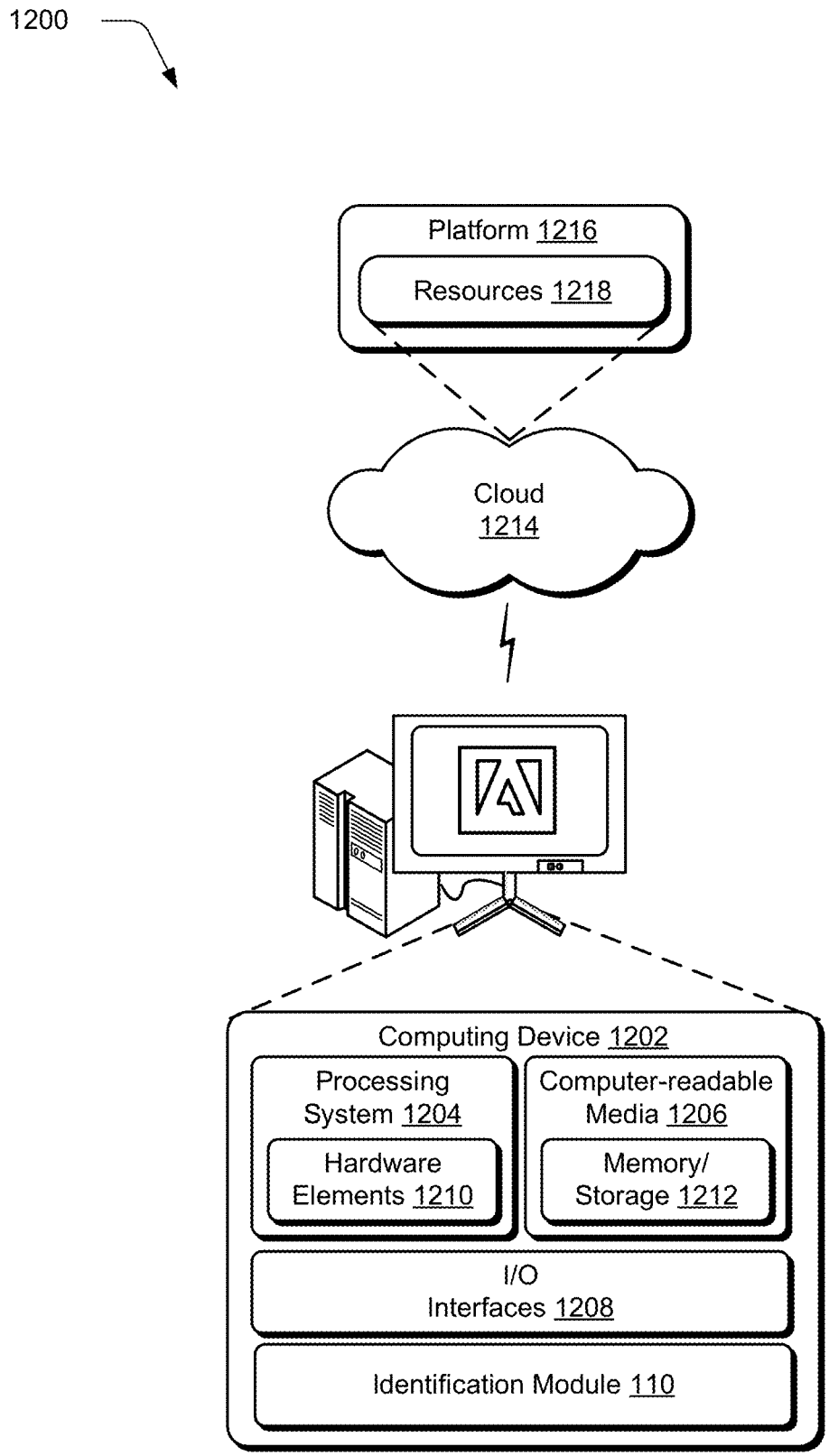
FIG. 12 illustrates an example system that includes an example computing device that is representative of one or more computing systems and/or devices for implementing the various techniques described herein.

FIG. 12 illustrates an example system 1200 that includes an example computing device that is representative of one or more computing systems and/or devices that are usable to implement the various techniques described herein. This is illustrated through inclusion of the identification module 110. The computing device 1202 includes, for example, a server of a service provider, a device associated with a client (e.g., a client device), an on-chip system, and/or any other suitable computing device or computing system.

The example computing device 1202 as illustrated includes a processing system 1204, one or more computer-readable media 1206, and one or more I/O interfaces 1208 that are communicatively coupled, one to another. Although not shown, the computing device 1202 further includes a system bus or other data and command transfer system that couples the various components, one to another. For example, a system bus includes any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1204 is representative of functionality to perform one or more operations using hardware. Accordingly, the processing system 1204 is illustrated as including hardware elements 1210 that are configured as processors, functional blocks, and so forth. This includes example implementations in hardware as an application specific integrated circuit or other logic device formed using one or more semiconductors. The hardware elements 1210 are not limited by the materials from which they are formed or the processing mechanisms employed therein. For example, processors are comprised of semiconductor(s) and/or transistors (e.g., electronic integrated circuits (ICs)). In such a context, processor-executable instructions are, for example, electronically-executable instructions.

The computer-readable media 1206 is illustrated as including memory/storage 1212. The memory/storage 1212 represents memory/storage capacity associated with one or more computer-readable media. In one example, the memory/storage 1212 includes volatile media (such as random access memory (RAM)) and/or nonvolatile media (such as read only memory (ROM), Flash memory, optical disks, magnetic disks, and so forth). In another example, the memory/storage 1212 includes fixed media (e.g., RAM, ROM, a fixed hard drive, and so on) as well as removable media (e.g., Flash memory, a removable hard drive, an optical disc, and so forth). The computer-readable media 1206 is configurable in a variety of other ways as further described below.

Input/output interface(s) 1208 are representative of functionality to allow a user to enter commands and information to computing device 1202, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which employs visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1202 is configurable in a variety of ways as further described below to support user interaction.

Various techniques are described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques are implementable on a variety of commercial computing platforms having a variety of processors.

Implementations of the described modules and techniques are storable on or transmitted across some form of computer-readable media. For example, the computer-readable media includes a variety of media that is accessible to the computing device 1202. By way of example, and not limitation, computer-readable media includes "computer-readable storage media" and "computer-readable signal media."

"Computer-readable storage media" refers to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which are accessible to a computer.

"Computer-readable signal media" refers to a signal-bearing medium that is configured to transmit instructions to the hardware of the computing device 1202, such as via a network. Signal media typically embodies computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1210 and computer-readable media 1206 are representative of modules, programmable device logic and/or fixed device logic implemented in a hardware form that is employable in some embodiments to implement at least some aspects of the techniques described herein, such as to perform one or more instructions. Hardware includes components of an integrated circuit or on-chip system, an application-specific integrated circuit (ASIC), a field-programmable gate array (FPGA), a complex programmable logic device (CPLD), and other implementations in silicon or other hardware. In this context, hardware operates as a processing device that performs program tasks defined by instructions and/or logic embodied by the hardware as well as a hardware utilized to store instructions for execution, e.g., the computer-readable storage media described previously.

Combinations of the foregoing are also employable to implement various techniques described herein. Accordingly, software, hardware, or executable modules are implementable as one or more instructions and/or logic embodied on some form of computer-readable storage media and/or by one or more hardware elements 1210. For example, the computing device 1202 is configured to implement particular instructions and/or functions corresponding to the software and/or hardware modules. Accordingly, implementation of a module that is executable by the computing device 1202 as software is achieved at least partially in hardware, e.g., through use of computer-readable storage media and/or hardware elements 1210 of the processing system 1204. The instructions and/or functions are executable/operable by one or more articles of manufacture (for example, one or more computing devices 1202 and/or processing systems 1204) to implement techniques, modules, and examples described herein.

The techniques described herein are supportable by various configurations of the computing device 1202 and are not limited to the specific examples of the techniques described herein. This functionality is also implementable entirely or partially through use of a distributed system, such as over a "cloud" 1214 as described below.

The cloud 1214 includes and/or is representative of a platform 1216 for resources 1218. The platform 1216 abstracts underlying functionality of hardware (e.g., servers) and software resources of the cloud 1214. For example, the resources 1218 include applications and/or data that are utilized while computer processing is executed on servers that are remote from the computing device 1202. In some examples, the resources 1218 also include services provided over the Internet and/or through a subscriber network, such as a cellular or Wi-Fi network.

The platform 1216 abstracts the resources 1218 and functions to connect the computing device 1202 with other computing devices. In some examples, the platform 1216 also serves to abstract scaling of resources to provide a corresponding level of scale to encountered demand for the resources that are implemented via the platform. Accordingly, in an interconnected device embodiment, implementation of functionality described herein is distributable throughout the system 1200. For example, the functionality is implementable in part on the computing device 1202 as well as via the platform 1216 that abstracts the functionality of the cloud 1214.

CONCLUSION

Although implementations of systems for identifying templates based on fonts have been described in language specific to structural features and/or methods, it is to be understood that the appended claims are not necessarily limited to the specific features or methods described. Rather, the specific features and methods are disclosed as example implementations of systems for identifying templates based on fonts, and other equivalent features and methods are intended to be within the scope of the appended claims. Further, various different examples are described and it is to be appreciated that each described example is implementable independently or in connection with one or more other described examples.

What is claimed is:

1. A method comprising:
receiving, by a processing device via a network, input data describing a selection of a font included in a collection of fonts;
generating, by the processing device, an embedding that represents the font in a latent space using a machine learning model trained on training data that describes triplets that include at least one of a training font, a positive digital template, or a negative digital template to generate embeddings for digital templates in the latent space based on intent phrases associated with the digital templates and embeddings for fonts in the latent space based on intent phrases associated with the fonts;
identifying, by the processing device, a digital template included in a collection of digital templates based on the embedding that represents the font and an embedding that represents the digital template in the latent space; and
generating, by the processing device, an indication of the digital template for display in a user interface.

2. The method as described in claim 1, further comprising:
receiving interaction data describing an interaction relative to the indication of the digital template; and
training a neural collaborative filtering model on additional training data based on the interaction data.

3. The method as described in claim 2, wherein the neural collaborative filtering model represents an item by combining a representation of a font and a representation of a digital template.

4. The method as described in claim 2, further comprising identifying a different digital template included in the collection of digital templates using the neural collaborative filtering model based on an identifier associated with the selection of the font.

5. The method as described in claim 2, wherein the neural collaborative filtering model is trained on the additional training data using a focal loss.

6. The method as described in claim 1, wherein a positive digital template of the training data is identified based on data describing a use of a training font of the training data to render glyphs of text in the positive digital template.

7. The method as described in claim 1, wherein a negative digital template of the training data is curated by randomly selecting a training font of the training data from the collection of fonts.

8. The method as described in claim 1, wherein a negative digital template of the training data is identified based on a distance between a vector representation of intent phrases associated with a training font of the training data and a vector representation of intent phrases associated with the negative digital template.

9. The method as described in claim 1, wherein the machine learning model is trained using a triplet loss based on the triplets of the training data.

10. A system comprising:
a memory component; and
a processing device coupled to the memory component, the processing device to perform operations comprising:
receiving input data describing a selection of a font included in a collection of fonts;
generating an embedding that represents the font in a latent space using a machine learning model trained on training data that describes triplets that include at least one of a training font, a positive digital template, or a negative digital template to generate embeddings for digital templates in the latent space based on intent phrases associated with the digital templates and embeddings for fonts in the latent space based on intent phrases associated with the fonts;
identifying a digital template included in a collection of digital templates based on the embedding that represents the font and an embedding that represents the digital template in the latent space; and
generating an indication of the digital template for display in a user interface.

11. The system as described in claim 10, the operations further comprising:
receiving interaction data describing an interaction relative to the indication of the digital template; and
training a neural collaborative filtering model on additional training data based on the interaction data.

12. The system as described in claim 11, wherein the neural collaborative filtering model represents an item by combining a representation of a font and a representation of a digital template.

13. The system as described in claim 11, wherein the neural collaborative filtering model identifies a different digital template included in the collection of digital templates based on an identifier associated with the selection of the font.

14. The system as described in claim 11, wherein the neural collaborative filtering model is trained on the additional training data using a focal loss.

15. The system as described in claim 10, wherein positive digital templates of the training data are identified based on data describing a use of training fonts of the training data to render glyphs of text in the positive digital templates and negative digital templates of the training data are curated by randomly selecting the training fonts from the collection of fonts.

16. A non-transitory computer-readable storage medium storing executable instructions, which when executed by a processing device, cause the processing device to perform operations comprising:
receiving interaction data describing an interaction relative to an indication of a digital template included in a collection of digital templates, the digital template identified based on input data describing a selection of a font included in a collection of fonts using a machine learning model trained on training data to generate embeddings for digital templates and fonts in a latent space;
training a neural collaborative filtering model on additional training data based on the interaction data;
identifying an item using the neural collaborative filtering model based on an identifier associated with the selection of the font by combining a representation of the font and a representation of an additional digital template; and generating an indication of the additional digital template included in the collection of digital templates for display in a user interface based on the item.

17. The non-transitory computer-readable storage medium as described in claim 16, wherein the neural collaborative filtering model is trained on the additional training data using a focal loss.

18. The non-transitory computer-readable storage medium as described in claim 16, wherein the training data describes triplets that include a training font, a positive digital template, and a negative digital template.

19. The non-transitory computer-readable storage medium as described in claim 18, wherein the positive digital template is identified based on data describing a user of the training font to render glyphs of text in the positive digital template.

20. The non-transitory computer-readable storage medium as described in claim 16, wherein the representation of the font includes font features based one or more font tags, deep font vectors, font metrics data, or font class features.

\* \* \* \* \*